United States Patent Office 2,772,293
Patented Nov. 27, 1956

2,772,293

PROCESS OF HYDROGENATING MALEIC ANHYDRIDE WITH A NICKEL OR COBALT MOLYBDITE CATALYST

Walter W. Gilbert, Wilmington, Del., and Benjamin W. Howk, West Chester, Pa., assignors to E. I. du Pont de Nemours and Company, Wilmington, Del., a corporation of Delaware No Drawing. Application July 13, 1953, Serial No. 367,744

5 Claims. (Cl. 260—343.6)

This invention relates to a new and improved process for the direct catalytic hydrogenation of maleic anhydride to tetrahydrofuran, gamma-butyrolactone, and tetramethylene glycol. More specifically, this invention has as its object the direct one-step production of the aforementioned hydrogenation products, preferably tetrahydrofuran, from maleic anhydride.

Such one-step production of these substances may be accomplished by reacting maleic anhydride with hydrogen at an elevated temperature and pressure in the presence of a metal molybdite as a catalyst.

In accordance with one embodiment of this invention, a pressure reactor is charged with the anhydride, catalyst and, if desired, a solvent. The reactor is assembled, cooled, and evacuated. Hydrogen is then injected to a pressure in excess of 200 atmospheres and the charge heated to a temperature of at least 160° C. At intervals, as necessary, hydrogen is injected to maintain the pressure within the reactor at the level selected for the reaction. After reaction is complete, as evidenced by cessation of pressure drop, the reaction mixture is permitted to cool, the reactor is opened, and the contents discharged and filtered. The filtrate is then processed by methods well known to those skilled in the art, e. g., fractional distillation, to isolate the products of reaction.

The following examples illustrate the invention by several specific embodiments. The specific details of these examples are not to be taken as limitations upon the invention. Unless otherwise stated, the reactor employed has a capacity of approximately 400 cc. and the yields refer to the yields of isolated products, without compensation for recovery of unreacted anhydride or anhydride precursors.

*Example I*

A pressure reactor is charged with 196 grams (2 moles) of maleic anhydride and 10 grams of nickel molybdite catalyst. This mixture is heated with shaking to 180° C. to 200° C. for a period of one year, under a hydrogen pressure of 200 to 500 atmospheres. After the rate of initial hydrogen absorption has diminished, the mixture is further heated with shaking at 250° C. for nineteen hours under a hydrogen pressure of 800 to 1000 atmospheres until hydrogen absorption has ceased. After filtering the reaction mixture to remove the catalyst, there is recovered 193 grams of filtrate. A preliminary fractional distillation of the filtrate gives a separation into tetrahydrofuran-water azeotrope, water, tetramethylene glycol, and a very high boiling fraction. Careful redistillation of these fractions gives 48 grams of tetrahydrofuran-water azeotrope containing 95.7% tetrahydrofuran, which corresponds to a 32% yield of tetrahydrofuran based on the maleic anhydride, and 40 grams (22% yield) of tetramethylene glycol.

*Example II*

Maleic anhydride (196 grams, 2 moles) is hydrogenated at 200° C. to 205° C. and 300 atmospheres for thirteen hours in the presence of 51.5 grams of nickel molybdite catalyst. A rapid distillation is used to recover the liquid products from the catalyst. The distillate is refractionated through a spinning band column with recovery of 14 grams of tetrahydrofuran-water azeotrope containing 95.7% tetrahydrofuran, which corresponds to a 9% yield of tetrahydrofuran based on the maleic anhydride, and 86 grams (65% yield) of gamma-butyrolactone. The gamma-butyrolactone may be further hydrogenated to tetrahydrofuran in 78% conversion in the presence of nickel molybdite at 200° C. to 250° C. under a hydrogen pressure of 300 to 900 atmospheres for twelve hours.

*Example III*

A pressure reactor is charged with 196 grams (2 moles) of maleic anhydride and 52.7 grams of nickel molybdite catalyst. The reactor is pressured with hydrogen and shaken and heated to 190° C. under a hydrogen pressure of 300 atmospheres for two hours. After the initial hydrogen absorption, the heating and shaking are continued for four hours at 275° C. under a hydrogen pressure of 800 to 900 atmospheres. The reaction product, when processed as in Example II, is found to contain 88 grams of tetrahydrofuran-water azeotrope containing 95.7% tetrahydrofuran, which corresponds to 58.5% yield of tetrahydrofuran based on the maleic anhydride.

*Example IV*

A mixture of 196 grams (2 moles) of maleic anhydride and 10 grams of nickel molybdite catalyst is placed in a pressure reactor and shaken with hydrogen at 170° C. to 200° C. under 500 to 1000 atmospheres of hydrogen pressure for twenty hours. The reaction product is filtered to remove the catalyst and the filtrate fractionated to recover gamma-butyrolactone and tetramethylene glycol (19% yield).

The nickel molybdite catalyst used in the above examples may be prepared as follows:

Seventeen hundred sixty-six (1766) grams of ammonium p-molybdate [$(NH_4)_6Mo_7O_{24} \cdot 4H_2O$], equivalent to 10 moles of $MoO_3$, is dissolved in 5000 cc. of distilled water and neutralized by the addition of 900 cc. of 28% aqueous ammonia. The resulting solution of ammonium molybdate [$(NH_4)_2MoO_4$], containing 1.9 moles of excess ammonia, is then added with stirring at room temperature to a solution of nickel nitrate, prepared by dissolving 2908 grams of nickel nitrate hexahydrate, $Ni(NO_3)_2 \cdot 6H_2O$, equivalent to 10 moles of nickel in 5000 cc. of distilled water. A pale green precipitate is formed in an acid slurry having a pH of approximately 4 by alkaline-acid paper. The pH of the slurry is adjusted to 7 (Beckman pH meter) by the addition of 500 cc. of 28% aqueous ammonia. The precipitate is then cooled, filtered, dried, and calcined at 400° C. for eighteen hours. The calcined product, by analysis, is found to contain 23.2% nickel and 46.4% molybdenum. The calcined product is reduced in hydrogen at gradually increasing temperatures up to 550° C. The reduced product is highly pyrophoric and glows on exposure to air. Analysis shows the reduced product to contain 26.66% nickel and 33.10% molybdenum, corresponding to $NiMoO_2 \cdot 0.2MoO_3$.

*Example V*

Maleic anhydride (196 grams, 2 moles) is hydrogenated at 200° C. to 275° C. under 300 to 900 atmospheres hydrogen pressure for fourteen hours in the presence of 50 grams of cobalt molybdite catalyst, CoMoO₃, which may be prepared as disclosed in Example IV of U. S. Patent No. 2,572,300. A rapid distillation is used to recover the liquid products from the catalyst. The distillate is refractionated through a spinning band column with recovery of 72 grams tetrahydrofuran-water azeotrope containing 95.7% tetrahydrofuran, which corresponds to a 48% yield of tetrahydrofuran, based on the maleic anhydride, along with small amounts of gamma-butyrolactone and tetramethylene glycol.

The nature of the reaction product, i. e., the proportion of tetrahydrofuran, gamma-butyrolactone and tetramethylene glycol in the reaction product is determined by the conditions of temperature, pressure, catalyst concentration, and time of reaction employed.

In general, the process can be operated at temperatures of from 160° C. to 300° C. and pressures between 150 and 3000 atmospheres, but since best results from the standpoint of cost and yield of desired products are obtained with temperatures in the range of 180° C. to 275° C. and pressures within the range of 300 to 1500 atmospheres this embraces the temperature and pressure conditions usually employed.

The time of reaction varies over wide limits and depends upon the temperature and pressure conditions used, activity and concentration of catalyst, and mode of operation. In a batch process, operating at 180° C. to 275° C. and pressures of 800 to 1500 atmospheres, the time is between two and twenty-four hours.

As above described, this invention may be practiced to produce tetrahydrofuran, gamma-butyrolactone, or tetramethylene glycol in preponderant proportions. The production of tetrahydrofuran in preponderant proportion is however greatly preferred. Such production of relatively high yields of tetrahydrofuran in a one-step process may be promoted by the use of temperatures between 250° C. and 275° C. and pressures between 800 and 1000 atmospheres. Lower temperatures and pressures, e. g., 200° C. to 205° C. and 300 atmospheres, promote the formation of the lactone, and the combination of low temperatures 170° C. to 200° C. and relatively high pressures of 500 to 1000 atmospheres is inducive to the formation of the lactone and tetramethylene glycol mixtures.

The catalyst may be used as pellets or as finely divided powders. For use in a continuous flow process it is best that the catalyst be in the form of pellets and thus minimize mechanical losses and avoid excessive resistance to fluid flow. In batch operation, it is best that the catalyst be in finely divided form because in that way maximum activity is obtained.

The process of this invention can be carried out as a batch, semi-continuous, or continuous operation.

In a continuous flow process, the maleic anhydride and hydrogen, with or without a solvent, under pressure is passed over a stationary bed of catalyst at such a rate as to permit sufficient time of contact with the heated catalyst to bring about the desired reaction. Alternatively, a slurry of finely divided catalyst, the maleic anhydride and hydrogen, can be pumped under pressure through a heated reaction zone at an appropriate rate of flow.

In batch operation, the amount of catalyst is at least 1% by weight of the maleic anhydride being processed. However, if desired, as much as 100% of the weight of the anhydride, or more, can be used, and there is some advantage in using such high catalyst concentrations to effect a rapid reaction and to give maximum yield of cyclic ether.

The use of the metal molybdite catalysts in accordance with the present invention for the production of tetrahydrofuran, gamma-butyrolactone, and tetramethylene glycol from maleic anhydride is not only new and unobvious but permits the direct, one-step production of these materials from the maleic anhydride. Prior to this invention the direct one-step production of tetrahydrofuran from maleic anhydride was unknown. This is expected to provide an economical synthetic process for the production of tetrahydrofuran which is at present commercially derived from agricultural waste products. These molybdite catalysts possess high activity and selectivity for the reaction above described and are relatively resistant to sintering and poisoning and decomposition by water. They also possess slight tendency to carry the reaction beyond the desired stage of tetrahydrofuran and tetramethylene glycol formation.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

We claim:

1. The process which comprises reacting maleic anhydride with hydrogen at a temperature between 160° C. and 300° C. and a pressure between 150 atmospheres and 3000 atmospheres in the presence of a metal molybdite from the group consisting of nickel and cobalt molybdites, filtering, and recovering tetrahydrofuran, gamma-butyrolactone, and tetramethylene glycol from the filtrate.

2. The process which comprises reacting maleic anhydride with hydrogen at a temperature between 180° C. and 275° C. and a pressure between 300 atmospheres and 1500 atmospheres in the presence of a metal molybdite consisting of nickel and cobalt molybdites, filtering, and recovering tetrahydrofuran, gamma-butyrolactone, and tetramethylene glycol from the filtrate.

3. The process which comprises reacting maleic anhydride with hydrogen at a temperature between 180° C. and 275° C. and a pressure between 300 atmospheres and 1500 atmospheres in the presence of nickel molybdite, filtering, and recovering tetrahydrofuran, gamma-butyrolactone, and tetramethylene glycol from the filtrate.

4. The process which comprises reacting maleic anhydride with hydrogen at a temperature between 180° C. and 275° C. and a pressure between 300 atmospheres and 1500 atmospheres in the presence of cobalt molybdite, filtering, and recovering tetrahydrofuran, gamma-butyrolactone, and tetramethylene glycol from the filtrate.

5. The process for the production of tetrahydrofuran which comprises reacting maleic anhydride with hydrogen at a temperature between 250° C. and 275° C. and a pressure between 800 and 1000 atmospheres in the presence of a metal molybdite from the group consisting of nickel and cobalt molybdites, filtering, and recovering tetrahydrofuran, gamma-butyrolactone, and tetramethylene glycol from the filtrate.

References Cited in the file of this patent

UNITED STATES PATENTS

| | | |
|---|---|---|
| 2,066,533 | Lazier | Jan. 5, 1937 |
| 2,072,861 | Amed et al. | Mar. 9, 1937 |
| 2,130,501 | Lazier | Sept. 20, 1938 |
| 2,572,300 | Arnold et al. | Oct. 23, 1951 |
| 2,584,531 | Arnold et al. | Feb. 2, 1952 |

OTHER REFERENCES

Wojcik et al.: J. A. C. S., 55:4939–46 (1933).